(12) United States Patent
Yokoyama et al.

(10) Patent No.: US 11,674,913 B2
(45) Date of Patent: Jun. 13, 2023

(54) SAMPLE ANALYSIS APPARATUS AND METHOD

(71) Applicant: JEOL Ltd., Tokyo (JP)

(72) Inventors: Takaomi Yokoyama, Tokyo (JP); Takanori Murano, Tokyo (JP)

(73) Assignee: JEOL Ltd., Tokyo (JP)

( * ) Notice: Subject to any disclaimer, the term of this patent is extended or adjusted under 35 U.S.C. 154(b) by 160 days.

(21) Appl. No.: 17/383,532

(22) Filed: Jul. 23, 2021

(65) Prior Publication Data

US 2022/0026378 A1    Jan. 27, 2022

(30) Foreign Application Priority Data

Jul. 27, 2020   (JP) .............................. JP2020-126571

(51) Int. Cl.
*G01N 23/2252* (2018.01)
*G01N 23/2209* (2018.01)
*G01N 23/2276* (2018.01)

(52) U.S. Cl.
CPC ..... *G01N 23/2252* (2013.01); *G01N 23/2209* (2018.02); *G01N 23/2276* (2013.01); *G01N 2223/079* (2013.01)

(58) Field of Classification Search
CPC .......... G01N 23/2252; G01N 23/2209; G01N 23/2276; G01N 2223/079
USPC ................................................. 250/306, 307
See application file for complete search history.

(56) References Cited

U.S. PATENT DOCUMENTS

| | | | |
|---|---|---|---|
| 2004/0099805 A1 | 5/2004 | Ochiai et al. | |
| 2004/0126909 A1 | 7/2004 | Obara et al. | |
| 2011/0155907 A1 | 6/2011 | Bushell | |
| 2015/0092921 A1 | 4/2015 | Hansford | |
| 2015/0168321 A1* | 6/2015 | Tanaka | G01N 23/2276 250/305 |
| 2015/0270094 A1 | 9/2015 | Ikku | |
| 2019/0011379 A1* | 1/2019 | Yun | H01J 35/12 |
| 2020/0335406 A1* | 10/2020 | Liman | H01L 22/20 |
| 2021/0356412 A1* | 11/2021 | Yun | G01N 23/223 |

FOREIGN PATENT DOCUMENTS

| | | |
|---|---|---|
| JP | S6339855 U | 3/1988 |
| JP | 2002116163 A | 4/2002 |
| JP | 2004151045 A | 5/2004 |
| JP | 2004191187 A | 7/2004 |
| JP | 2012500976 A | 1/2012 |
| JP | 2013186062 A | 9/2013 |
| JP | 2015184040 A | 10/2015 |
| JP | 2018004298 A | 1/2018 |
| WO | 2010022409 A2 | 2/2010 |

OTHER PUBLICATIONS

Extended European Search Report issued in WP21187274.2 dated Dec. 7, 2021.

* cited by examiner

*Primary Examiner* — Kiet T Nguyen

(74) *Attorney, Agent, or Firm* — The Webb Law Firm

(57) ABSTRACT

Spectrums are measured by irradiating an electron beam on a sample while varying an accelerating potential and by detecting X-rays emitted from the sample. A normalizer unit normalizes the spectrums and thereby calculates normalized spectrums. A difference calculator unit calculates difference spectrums based on the normalized spectrums. A search unit performs a search in a database for each comparison difference spectrum, and identifies compounds contained in the sample.

12 Claims, 11 Drawing Sheets

SAMPLE ANALYSIS APPARATUS AND METHOD

CROSS REFERENCE TO RELATED APPLICATION

This application claims priority to Japanese Patent Application No. 2020-126571 filed Jul. 27, 2020, the disclosure of which is hereby incorporated by reference in its entirety.

BACKGROUND OF THE INVENTION

Field of the Invention

The present disclosure relates to a sample analysis apparatus and method, and more particularly to a spectral analysis method.

Description of Related Art

By irradiating an electron beam onto a sample and spectrally dispersing characteristic X-rays emitted from the sample, an intensity spectrum reflecting the composition and the state of the sample can be obtained. In particular, by spectrally dispersing an intensity spectrum of characteristic X-rays in the soft X-ray range, it is possible to observe characteristic X-rays generated due to transition of electrons from the valence band to the core level, which reflects the chemical bonding state in the sample. In other words, through analysis of this intensity spectrum, the chemical bonding state of elements in the sample can be identified.

As a conventional spectral analysis method, a fingerprinting method is known. According to this method, intensity spectrums obtained from standard samples are registered in a database. A search is made in the database based on an intensity spectrum obtained from a sample, and the composition and the state of the sample can thereby be identified.

JP S63-39855 U discloses a technique of calculating an absorption spectrum from a difference between two intensity spectrums obtained while varying the accelerating potential of the electron beam, and displaying the calculated absorption spectrum. The absorption spectrum corresponds to a difference between the two intensity spectrums. JP S63-39855 U neither discloses use of the absorption spectrum for identification of a sample, nor describes construction of a database of absorption spectrums.

JP 2002-116163 A discloses a measurement method in which an electron beam is irradiated onto a sample to obtain an energy spectrum in the sample depth direction. This energy spectrum is used for sample analysis. JP 2002-116163 A nowhere describes calculating or making use of a difference spectrum.

In an intensity spectrum observed by irradiating an electron beam onto a sample and detecting characteristic X-rays emitted from the sample, when an absorption edge is present near a peak of interest (or a portion of interest in the spectral shape), the peak energies are changed in accordance with changes in the accelerating potential of the electron beam. Such a situation presents difficulties in using the conventional fingerprinting method for performing a sample analysis, as explained as follows. For example, concerning a transition metal, the L3 absorption edge is present between the Lα-line peak and the Lβ-line peak. When these peaks of interest of a transition metal are shifted, it is extremely difficult to distinguish whether the shift resulted from a change in chemical state or from a change in self-absorption.

The present disclosure is directed to providing a new sample analysis technique that is not susceptible or is hardly susceptible to influence from an absorption edge. Alternatively, the present disclosure is directed to providing a sample analysis apparatus capable of accurately analyzing a sample even when the accelerating potential of the electron beam is varied.

SUMMARY OF THE INVENTION

A sample analysis apparatus according to an aspect of the present disclosure includes: a normalizer unit which normalizes spectrums measured by irradiating an electron beam onto a sample while varying an accelerating potential and by detecting X-rays emitted from the sample, and thereby calculates normalized spectrums; a difference calculator unit which calculates at least one difference spectrum based on the normalized spectrums; and an analyzer unit which analyzes the sample based on the at least one difference spectrum.

A sample analysis method according to an aspect of the present disclosure includes: a step of measuring spectrums by irradiating an electron beam onto a sample while varying an accelerating potential and by detecting X-rays emitted from the sample; a step of normalizing the spectrums and thereby calculating normalized spectrums; a step of calculating at least one difference spectrum based on the normalized spectrums; and a step of identifying a compound contained in the sample by performing a search, based on the at least one difference spectrum, in a database containing sets of difference spectrum information regarding known compounds.

BRIEF DESCRIPTION OF THE DRAWINGS

Embodiment(s) of the present disclosure will be described based on the following figures, wherein.

Figure 1:
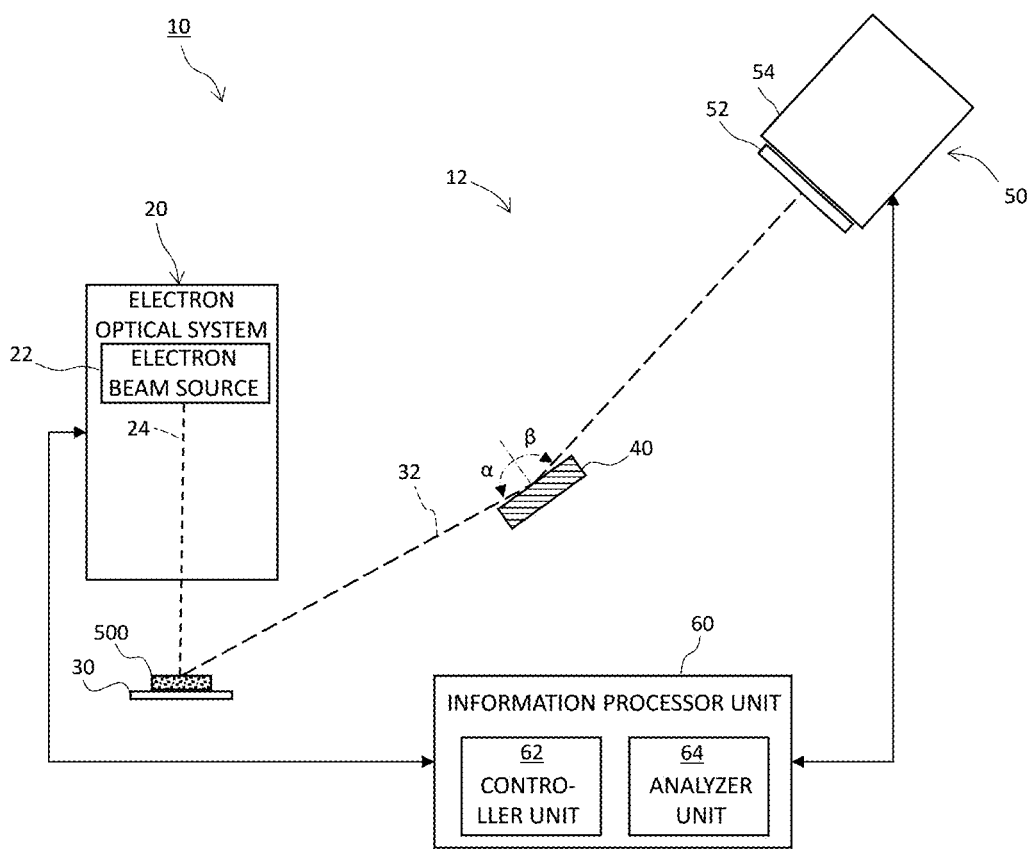
FIG. 1 is a diagram showing a schematic configuration of a sample analysis apparatus according to an embodiment.

DESCRIPTION OF THE INVENTION (1) Overview of Embodiments

A sample analysis apparatus according to an embodiment comprises a normalizer unit, a difference calculator unit, and an analyzer unit. The normalizer unit normalizes spectrums measured by irradiating an electron beam onto a sample while varying an accelerating potential and by detecting X-rays emitted from the sample, and thereby calculates normalized spectrums. The difference calculator unit calculates at least one difference spectrum based on the normalized spectrums. The analyzer unit analyzes the sample based on the at least one difference spectrum.

In a difference spectrum calculated from two spectrums (or intensity spectrums) obtained while varying the accelerating potential, the position of a peak does not change or changes only slightly even when the accelerating potentials are changed. This phenomenon has been ascertained through experiments and studies carried out by the present inventors. The above-described configuration makes use of this new insight for sample analysis. The above-described configuration functions effectively particularly in cases where an absorption edge is present near a peak of interest (or a portion of interest in the spectral shape). In the above-described configuration, the spectrums measured are normalized before calculating a difference spectrum, so that an accurate difference spectrum is obtained.

In an embodiment, the analyzer unit comprises a database and a search unit. The database contains sets of difference spectrum information regarding known compounds. The search unit performs a search in the database based on the at least one difference spectrum, and thereby identifies a compound contained in the sample. The search in the database may serve to identify a state (e.g., crystal orientation) of the sample. Each of the sets of difference spectrum information includes at least one information of a difference spectrum itself and information indicating a feature of the difference spectrum.

In an embodiment, the difference calculator unit calculates difference spectrums based on the normalized spectrums. From among the difference spectrums, one or more comparison difference spectrums (one or more representative spectrums) are specified. All of the difference spectrums may respectively be used as comparison difference spectrums, or alternatively, a difference spectrum representative of the difference spectrums may be used as a comparison difference spectrum. The search unit performs a search in the database for each comparison difference spectrum.

A sample analysis apparatus according to an embodiment further comprises a display device that displays the difference spectrums, and an input device that allows a user to select one or more comparison difference spectrums from among the difference spectrums.

In an embodiment, the difference spectrums are divided into groups, and a comparison difference spectrum is specified for each group. The groups respectively correspond to depth ranges in the sample. The analyzer unit identifies a compound contained in the sample for each depth range. In an embodiment, the analyzer unit divides the difference spectrums into the groups by using similarity in spectrum shape as a grouping criterion.

In an embodiment, during a process of varying the accelerating potential, the depth of electron penetration into the sample changes, and the intensity of a specific peak included in each spectrum is varied among the spectrums. The sample analysis apparatus further comprises a creation unit that creates a chart by mapping, in a predetermined coordinate system, elements corresponding to respective specific peaks included in the spectrums. The predetermined coordinate system has a first axis showing the rate of change of electron penetration depth, and a second axis showing the rate of change of the intensity of the specific peak. Based on the arrangement of the elements in the chart, one or more comparison difference spectrums are specified. A sample analysis apparatus according to an embodiment further comprises an X-ray spectroscope that spectrally disperses X-rays. The X-ray spectroscope generates the plurality of spectrums.

A sample analysis method according to an embodiment comprises a first step, a second step, a third step, and a fourth step. In the first step, spectrums are measured by irradiating an electron beam onto a sample while varying an accelerating potential and by detecting X-rays emitted from the sample. In the second step, the spectrums are normalized, and normalized spectrums are thereby calculated. In the third step, at least one difference spectrum is calculated based on the normalized spectrums. In the fourth step, a compound contained in the sample is identified by performing a search, based on the at least one difference spectrum, in a database containing sets of difference spectrum information regarding known compounds.

In an embodiment, in the step of calculating the normalized spectrums, each spectrum is normalized based on an intensity of a reference peak included in the spectrum. The normalized spectrums include a reference spectrum and a target spectrum. In the step of calculating the at least one difference spectrum, a logarithmic difference is calculated, for each energy, between the reference spectrum and the target spectrum.

Sample analysis apparatuses according to embodiments are further described below.

A sample analysis apparatus according to an embodiment comprises: an input means which receives input of intensity spectrums obtained by spectrally dispersing X-rays generated from a sample irradiated with an electron beam; and a calculation means which normalizes intensity spectrums corresponding to accelerating potentials of the electron beam by using, as a reference, an intensity of a reference peak within a region of interest, and calculates a difference spectrum from the normalized spectrums.

A sample analysis apparatus according to an embodiment further comprises an estimation unit which performs a search, based on the difference spectrum, in a database having sets of known compound information registered therein, and thereby estimates a compound contained in the sample or a state of the sample.

In an embodiment, the estimation unit estimates a compound contained in the sample or a state of the sample in connection with a depth range corresponding to a group formed of difference spectrums having similarity to each other.

In an embodiment, in a case where difference spectrums are divided into groups, the estimation unit estimates a compound contained in the sample or a state of the sample in connection with each of depth ranges corresponding to the groups.

A sample analysis apparatus according to an embodiment further comprises a display unit that displays a relationship between a rate of change of electron penetration depth and a rate of change of a peak top intensity in intensity spectrums, the relationship occurring when the accelerating potential of the electron beam is varied.

A sample analysis apparatus according to an embodiment further comprises a determination means that determines a state change in a depth direction based on the relationship between a rate of change of electron penetration depth and a rate of change of a peak top intensity in intensity spectrums, the relationship occurring when the accelerating potential of the electron beam is varied.

A sample analysis apparatus according to an embodiment further comprises an X-ray spectroscope that spectrally disperses X-rays generated from the sample irradiated with the electron beam. The input means receives input of the intensity spectrums from the X-ray spectroscope.

(2) Details of Embodiments

FIG. 1. is a diagram showing an overall configuration of a sample analysis apparatus 10 according to an embodiment.

The sample analysis apparatus 10 comprises an electron microscope, or more specifically, a scanning electron microscope. The sample analysis apparatus 10 includes a wavelength dispersive X-ray spectroscope 12, an electron optical system 20, a sample stage 30, and an information processor unit 60. The wavelength dispersive X-ray spectroscope 12 includes a diffraction grating 40 having unequally spaced grooves, and a detector unit 50.

The electron optical system 20 is a system for generating an electron probe. The electron optical system 20 includes an electron beam source 22 such as an electron gun, and the electron beam source 22 generates an electron beam 24. In the electron beam source 22, an accelerating potential for accelerating electrons is adjusted to generate electrons having a specified energy. Although not shown in drawing, the electron optical system 20 further includes a slit, a condenser lens, a scanning coil, an objective lens, and the like. The electron optical system 20 performs focusing, scanning, and the like of the electron beam 24.

The sample stage 30 is a component on which a sample 500 is placed. When the electron beam 24 is irradiated on the sample, characteristic X-rays 32 are generated at the sample 500. The characteristic X-rays are X-rays that are emitted during a process in which, in a situation where electrons in an inner shell orbital (i.e., an orbital at a deep position) of an atom constituting the sample 500 were collided and ejected by the electron beam 24, electrons in an outer shell orbital (i.e., an orbital at a shallow position) transition to the inner shell orbital. In particular, X-rays belonging in the soft X-ray range are signals useful for analyzing the composition, atomic bonding state, crystal structure, and the like of the sample. The characteristic X-rays 32 emitted from the sample 500 are collected by an X-ray focusing mirror (not shown in the drawing) and directed to the diffraction grating 40. In the present embodiment, soft X-rays are detected as the characteristic X-rays. Soft X-rays are X-rays having, for example, an energy no greater than 1 keV, no greater than 500 eV, or no greater than 100 eV.

The diffraction grating 40 is an optical element (or a spectrally-dispersing element) that disperses the characteristic X-rays 32 by wavelength. In other words, the output angle $\beta$ relative to the incident angle $\alpha$ has wavelength dependence due to the phenomenon of diffraction, and each characteristic X-ray component is output at an angle according to its wavelength. In this way, the incident characteristic X-rays 32 are resolved into components of the respective wavelengths; namely, components of the respective energies.

The detector unit 50 includes a CCD detector 52 and a CCD controller 54. The CCD detector 52 comprises a two-dimensional array of light receiving elements which receive X-rays and convert the X-rays into electric signals. By having the CCD detector 52 extending two-dimensionally, characteristic X-rays within a certain wavelength range (namely, within a certain energy range) can be received simultaneously or collectively. The CCD controller 54 controls the operation of the CCD detector 52, and also counts, separately for each of the light receiving elements, the number of electric signals output from the CCD detector 52. A number of counts over a set period of time (for example, 1 second, 5 seconds, 10 seconds, etc.) is obtained for each wavelength. In this way, an intensity spectrum of the characteristic X-rays 32 (i.e., a characteristic X-ray spectrum) is measured.

The information processor unit 60 comprises hardware and software. The hardware includes a CPU (central processing unit), a memory, and the like. The software includes an OS (operating system), an application program, and the like. The information processor unit 60 may be composed of a PC (personal computer). The information processor unit 60 may be composed of a single device, or may alternatively be composed of a plurality of devices.

The information processor unit 60 includes a controller unit 62 and an analyzer unit 64. The controller unit 62 controls the electron optical system 20 and the detector unit 50. The analyzer unit 64 is a device that analyzes an intensity spectrum (more precisely, intensity spectrum data) output from the CCD controller 54. In the present embodiment, the electron beam 24 is irradiated onto the sample 500 while the accelerating potential of the electron beam 24 is varied, and intensity spectrums (i.e., an intensity spectrum set) corresponding to accelerating potentials are thereby obtained.

Figure 2:
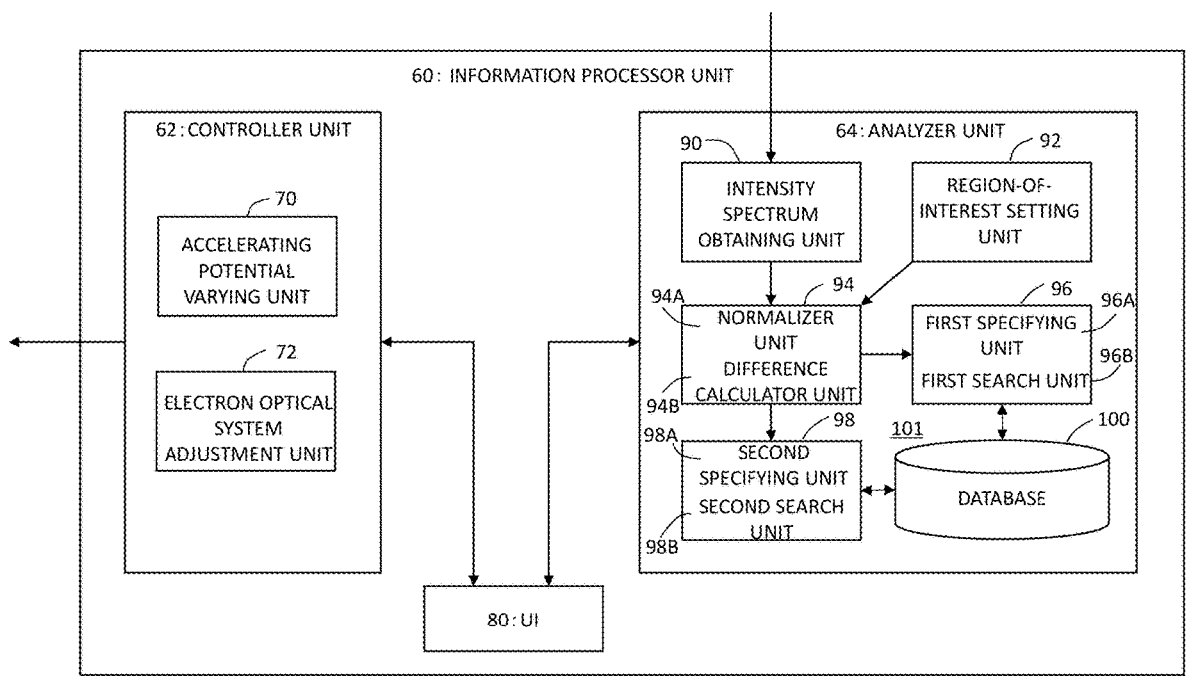
FIG. 2. is a block diagram showing an example configuration of an information processor unit.

FIG. 2 is a block diagram showing an example configuration of the information processor unit 60. As noted above, the information processor unit 60 includes the controller unit 62 and the analyzer unit 64. The information processor unit 60 also includes a user interface (UI) 80 that functions as an input device and a display device.

In the controller unit 62, an accelerating potential varying unit 70 and an electron optical system adjustment unit 72 are provided. The accelerating potential varying unit 70 performs a control to vary the accelerating potential in the electron beam source 22. The user sets, via the UI 80, a variation width and a number of variation steps for the accelerating potential. The accelerating potential varying unit 70 varies the accelerating potential according to the user settings. The variation of the accelerating potential corresponds to a variation of incident electron energy that contributes to X-ray excitation. Accordingly, the accelerating potential may be varied by changing an accelerating voltage for incident electrons, or by changing a bias voltage. The change of the bias voltage is, for example, a change of a sample bias voltage.

The electron optical system adjustment unit 72 adjusts the electron optical system in accordance with the variation of the accelerating potential. For example, the electron optical system adjustment unit 72 performs adjustment of an electric current to be applied to the electron optical system 20, adjustment of components such as the condenser lens and the objective lens, positional adjustment of the electron probe by probe tracking, and the like.

The UI 80 is composed of, for example, devices such as a touchscreen display, a keyboard, and a mouse. The user manipulates the UI 80 in accordance with contents of images displayed on the UI 80, and thereby specifies settings of the controller unit 62 and the analyzer unit 64. Further, via the UI 80, the user confirms the settings, analysis results, and the like.

The analyzer unit 64 comprises an intensity spectrum obtaining unit 90, a region-of-interest setting unit 92, a calculator unit 94, a processor unit 96, a processor unit 98, and a database 100.

The intensity spectrum obtaining unit 90 obtains an intensity spectrum set from the CCD controller. The region-of-interest setting unit 92 sets a common region of interest in the respective intensity spectrums in accordance with a user instruction received via the UI 80. For example, in each of the intensity spectrums, a region of interest is set at a portion including a target peak. In cases where an absorption edge is present near a target peak in a certain intensity spectrum; that is, in cases where a sample that generates such an intensity spectrum is the measurement target, the configuration detailed below functions effectively. In other words, spectral analysis or peak analysis can be performed without being influenced by the absorption edge. By means of the configuration detailed below, it also becomes possible to analyze the cause of a spectral shift that occurred in accordance with a change of the accelerating potential. In the following description, a portion of an intensity spectrum that is within a region of interest is in some cases referred to simply as an "intensity spectrum".

Figure 4:
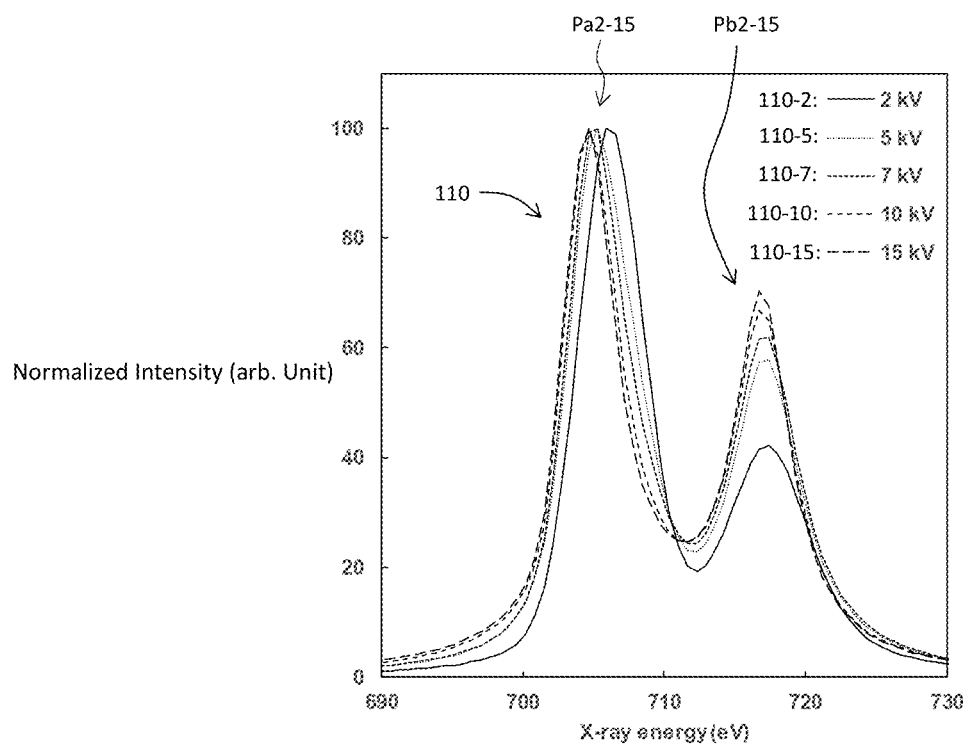
FIG. 4 is a diagram showing an example normalized intensity spectrum set.

The calculator unit 94 is composed of a normalizer unit 94A and a difference calculator unit 94B. The normalizer unit 94A normalizes each intensity spectrum so that the intensity at the top (or apex) of a reference peak included in the intensity spectrum becomes equal to a predetermined value. At that time, the highest peak in each spectrum may be designated as the reference peak, and the reference peak top intensity may be set to 100(%). The normalized intensity spectrums constitute a normalized intensity spectrum set, a specific example of which is shown in FIG. 4 described further below.

The difference calculator unit 94B generates one or more difference spectrums based on the normalized intensity spectrums. For example, a particular intensity spectrum among the normalized intensity spectrums is selected as a reference spectrum. In that case, the remaining one or more intensity spectrums are respectively used as target spectrums. The difference calculator unit 94B executes a difference calculation between the reference spectrum and each target spectrum regarding the respective energies. As a result, a difference spectrum is calculated for each target spectrum. Specifically, the difference calculation is a calculation for determining a logarithmic difference. The reference spectrum is selected by the user or is selected automatically, depending on the analysis method and the like.

Figure 5:
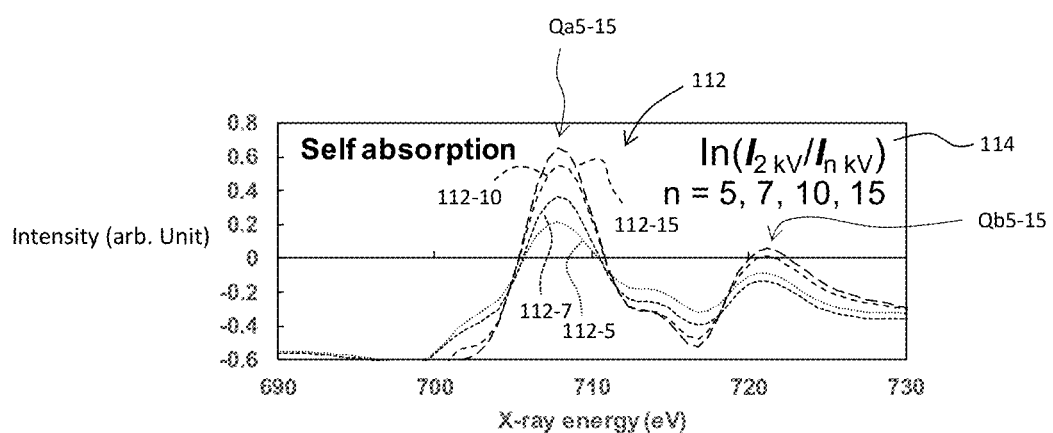
FIG. 5 is a diagram showing an example difference spectrum set.

For example, in a case where k (here, k is an integer greater than 2) number of accelerating potentials are set stepwise, k number of intensity spectrums are sequentially obtained. These intensity spectrums constitute the intensity spectrum set. Subsequently, the k number of obtained intensity spectrums are normalized. From among the k number of normalized intensity spectrums, a particular intensity spectrum is designated as the reference spectrum, and the remaining k−1 number of intensity spectrums are respectively used as the target spectrums. By performing the difference calculation between the reference spectrum and the k−1 number of intensity spectrums, k−1 number of difference spectrums (i.e., a difference spectrum set) are calculated. A specific example of the difference spectrum set is shown in FIG. 5 described further below.

The processor unit 96 includes a first specifying unit 96A and a first search unit 96B. The first specifying unit 96A specifies, from among the difference spectrum set, a comparison difference spectrum (or a representative difference spectrum) to be used for searching in the database 100. Specifically, the first specifying unit 96A determines, within the difference spectrum set, difference spectrums having similarity to each other (namely, difference spectrums which are depth-independent or have depthwise uniformity) as a group, and selects a comparison difference spectrum from within the group. Alternatively, the difference spectrum set may be displayed on the UI 80, and the user may be invited to select a comparison difference spectrum. In that case, a selection of a comparison difference spectrum is received at the UI 80.

The first search unit performs a search in the database 100 based on the comparison difference spectrum. As a result of this search, a compound contained in the sample is identified. The chemical bonding state, crystal structure, and the like may be identified. The difference spectrum set corresponds to a certain depth range in the sample. By performing the search in the database 100, a compound that is present across that depth range can be identified.

The processor unit 98 includes a second specifying unit 98A and a second search unit 98B. In cases where the difference spectrum set includes groups, the second specifying unit 98A specifies comparison difference spectrums (or representative difference spectrums) to be used for searching in the database 100. Specifically, the second specifying unit 98A directly or indirectly evaluates the difference spectrum set to determine groups. For this grouping, similarity in spectrum shape may be used as a criterion.

Difference spectrums corresponding to the entirety or a part of the difference spectrum set may respectively be used as comparison difference spectrums. The user may select comparison difference spectrums using the UI 80.

The second search unit 98B performs a search in the database 100 based on each of the comparison difference spectrums. As a result of this search, a compound contained in the sample is identified for each group; i.e., for each depth range in the sample. For each depth range, the crystal structure and the like may be identified.

Figure 9:
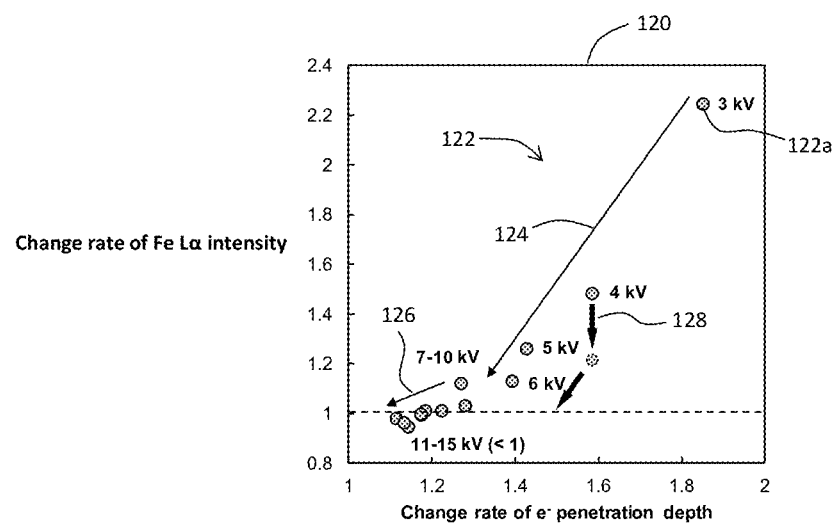
FIG. 9 is a diagram showing an example chart.

The processor unit 98 also functions as a chart creation unit. Specifically, the processor unit 98 has: a function to calculate rates of change of electron penetration depth based on the accelerating potentials; a function to calculate rates of change of intensities (or absolute intensities) of specific peaks included in the intensity spectrums; and a function to map, in a chart, graphic elements corresponding to the specific peaks based on those calculated results. Based on the chart, comparison difference spectrums representative of the depth ranges (or depth positions) in the sample are calculated. For each of the comparison difference spectrums; i.e., for each of the depth ranges, a search is performed in the database. A specific example of the chart is shown in FIG. 9 described further below.

The database 100 has registered therein records corresponding to known compounds. Each record includes compound information and difference spectrum information. In constructing the database 100, for each compound, a test using at least two accelerating potentials is conducted, and a difference spectrum is thereby obtained. The difference spectrum itself or information indicative of features of the difference spectrum constitutes the difference spectrum information. Examples of the information indicative of features of the difference spectrum include the energy position of a peak, the energy position of an inflection point, and the like.

Among the sets of difference spectrum information stored in the database 100, when specific difference spectrum information conforming to a comparison difference spectrum is retrieved, the compound information associated with the specific difference spectrum information is provided to the user. Examples of the compound information include the composition, molecular structure, crystal structure, crystal orientation, and the like of a compound. Concerning the sets of difference spectrum information, a further explanation is given below by reference to FIG. 7. The processor unit 96, the processor unit 98, and the database 100 constitute a sample analyzer unit 101.

First Embodiment

Figure 3:
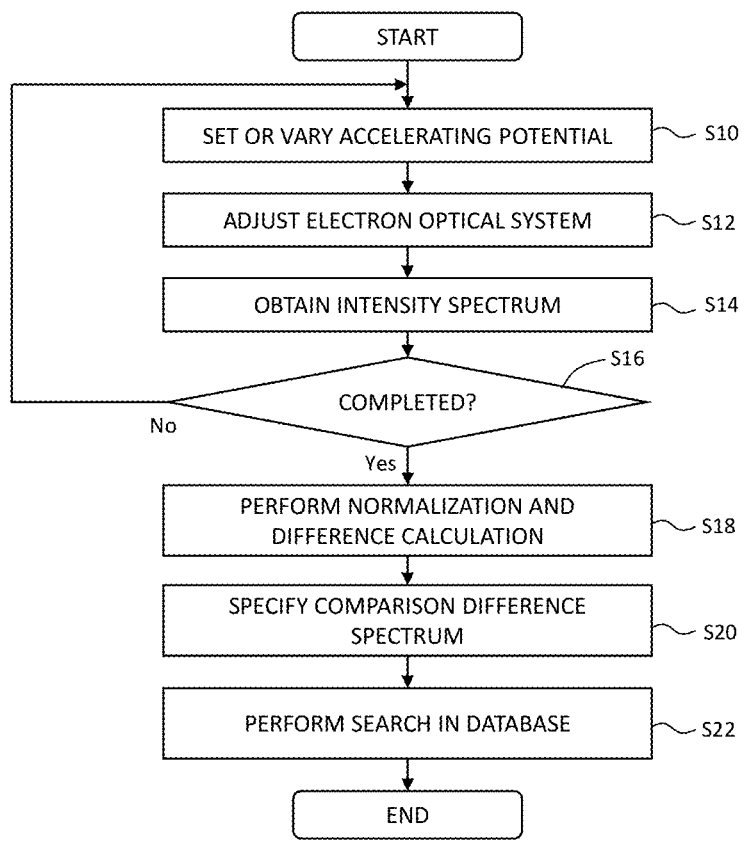
FIG. 3 is a flowchart showing a processing flow according to a first embodiment.

A first embodiment is next described by reference to FIG. 3. FIG. 3 is a flowchart showing processes according to the first embodiment.

The accelerating potential varying unit sets or varies the accelerating potential of the electron beam source (S10), so that an electron beam having an energy corresponding to the accelerating potential can be irradiated onto the sample. Before the irradiation, the electron optical system adjustment unit makes an adjustment to the electron optical system in accordance with the variation of the accelerating potential (S12). With that done, characteristic X-rays emitted from the sample under the newly-set accelerating potential can be detected. The detected characteristic X-rays are counted by the CCD controller. The intensity spectrum obtaining unit obtains an intensity spectrum by receiving input of data from the CCD controller (S14). The processes of steps S10 to S14 are repeated until intensity spectrums (i.e., an intensity spectrum set) corresponding to all respective designated accelerating potentials are obtained (S16).

Subsequently, the region-of-interest setting unit 92 sets a region of interest in each of the intensity spectrums constituting the intensity spectrum set. The normalizer unit then normalizes a spectrum portion in the region of interest for each intensity spectrum (S18). At that time, the intensity of a reference peak included in the region of interest is used as a reference. The difference calculator unit generates difference spectrums (i.e., a difference spectrum set) based on the normalized intensity spectrum set (S18).

From within the difference spectrum set, a comparison difference spectrum is specified (S20), and a search is performed in the database based on the comparison difference spectrum (S22). When specific difference spectrum information conforming to the comparison difference spectrum is retrieved, the compound information associated with the specific difference spectrum information is provided to the user.

FIG. 4 illustrates a normalized intensity spectrum set 110. The intensity spectrum set 110 is composed of intensity spectrums 110-2 to 110-15 corresponding to accelerating potentials. While each spectral shape shown in FIG. 4 corresponds to a portion of an intensity spectrum that is within a region of interest, it is noted that each spectral shape itself is also an intensity spectrum. In FIG. 4, the horizontal axis shows the characteristic X-ray energy, while the vertical axis shows the normalized intensity.

As an example, five intensity spectrums 110-2 to 110-15 corresponding to the accelerating potentials of 2, 5, 7, 10, and 15 kV are shown in FIG. 4. Each of the intensity spectrums 110-2 to 110-15 has two peaks Pa2-15 and Pb2-15. In the example shown, the peak Pa2-15 is designated as the reference peak, and each of the intensity spectrums 110-2 to 110-15 is normalized so that the peak top intensity of the peak Pa2-15 becomes equal to 100. The reference peak is selected as appropriate depending on the sample and the like. For example, in this case where the analysis target element is Fe and L lines emitted from Fe or other elements are the observation target, the Lα peak which has the highest value is designated as the reference peak.

FIG. 5 illustrates a difference spectrum set 112. The difference spectrum set 112 is composed of four difference spectrums 112-5 to 112-15 generated from the above-noted five intensity spectrums. The intensity spectrum corresponding to 2 keV is used as the reference spectrum, while the intensity spectrums corresponding to 5, 7, 10, and 15 keV are respectively used as the target spectrums. Reference numeral 114 denotes a mathematical formula for calculating the logarithmic difference. "I" denotes intensity for each energy in a normalized intensity spectrum, and n is equal to 5, 7, 10, or 15.

A higher accelerating potential causes an electron beam to penetrate further into the sample, resulting in a region of characteristic X-ray generation being located at a deeper position. Accordingly, each difference spectrum indicates, for the respective energies, absorption intensities that occur when characteristic X-rays generated in a depth range corresponding to a difference in two accelerating potentials are absorbed by the sample itself.

Each of the difference spectrums 112-5 to 112-15 includes an absorption peak Qa5-15 corresponding to the above-noted peak Pa2-15, and an absorption peak Qb5-15 corresponding to the above-noted peak Pb2-15. The absorption peak Qa5-15 is located at about 708 eV, while the absorption peak Qb5-15 is located at about 722 eV. Although the intensity of the absorption peak Qa5-15 and the intensity of the absorption peak Qb5-15 vary in accordance with the variation of the accelerating potential, the energy position of the absorption peak Qa5-15 and the energy position of the absorption peak Qb5-15 remain almost fixed regardless of the accelerating potential.

In intensity spectrums, due to influence of self-absorption, a peak energy position changes in accordance with changes in the accelerating potential. In contrast, in difference spectrums, a peak appears at an almost fixed energy position regardless of the accelerating potential. In other words, by using difference spectrums for sample analysis, it is possible to eliminate or reduce influence of an absorption edge.

In constructing the database, various difference spectrums are obtained from various compounds regarding which the composition, bonding state, crystal structure, and the like are known, and those difference spectrums are registered in the database. In the database, each individual difference spectrum itself may be registered, or features (such as peak energies) of each individual difference spectrum may be registered. According to the configuration of the present embodiment, compound identification and sample state determination can be easily carried out regarding, in particular, a sample for which an absorption edge is present near a peak of interest in the intensity spectrum, such as a transition element.

Second Embodiment

Figure 6:
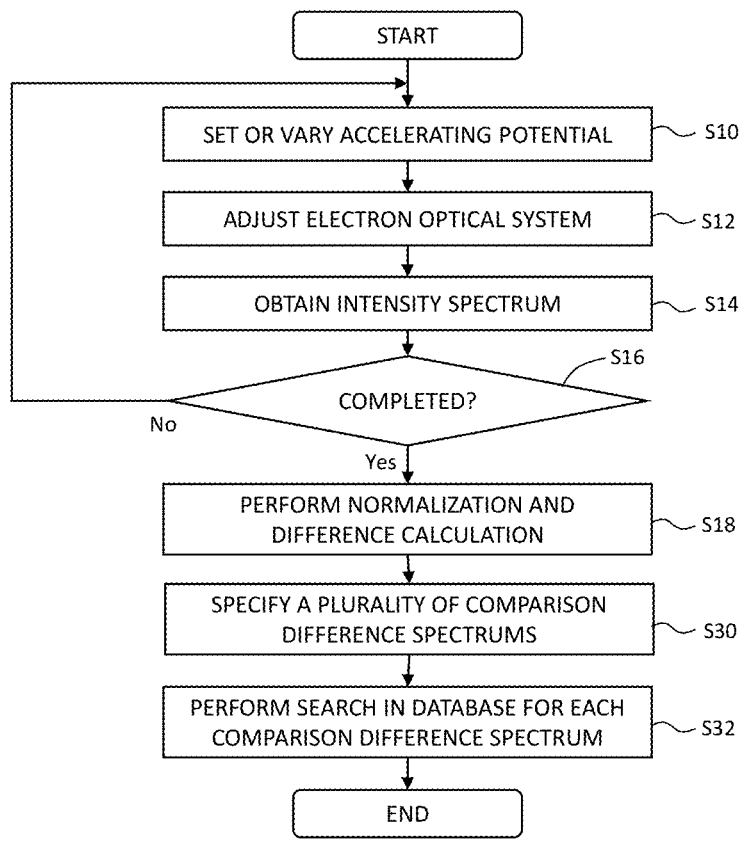
FIG. 6 is a flowchart showing a processing flow according to a second embodiment.

A second embodiment is next described by reference to FIG. 6. FIG. 6 is a flowchart showing processes according to the second embodiment. The processes of S10 through S18 in FIG. 6 are basically identical to those of S10 through S18 shown in FIG. 3.

In step S18, a difference spectrum set is calculated based on the normalized intensity spectrum set. In step S30, one or more groups are set up in the difference spectrum set by using, for example, shape similarity as a grouping criterion. For example, when a shape similarity is observed among difference spectrums corresponding to the accelerating potential range from 5 kV to 2 kV, while another shape similarity is observed among difference spectrums corresponding to the accelerating potential range from 10 kV to 5 kV, two groups are set up with a boundary located at around 5 kV. The two groups suggest presence of two kinds of compounds located next to each other in the depth direction.

For each of the groups, a comparison difference spectrum is specified in the group, and a search is performed in the database based on the comparison difference spectrum. By finding a registered difference spectrum that is similar to the comparison difference spectrum, a compound contained in the sample can be identified for each group; namely, for each depth range (S32).

Figure 7:
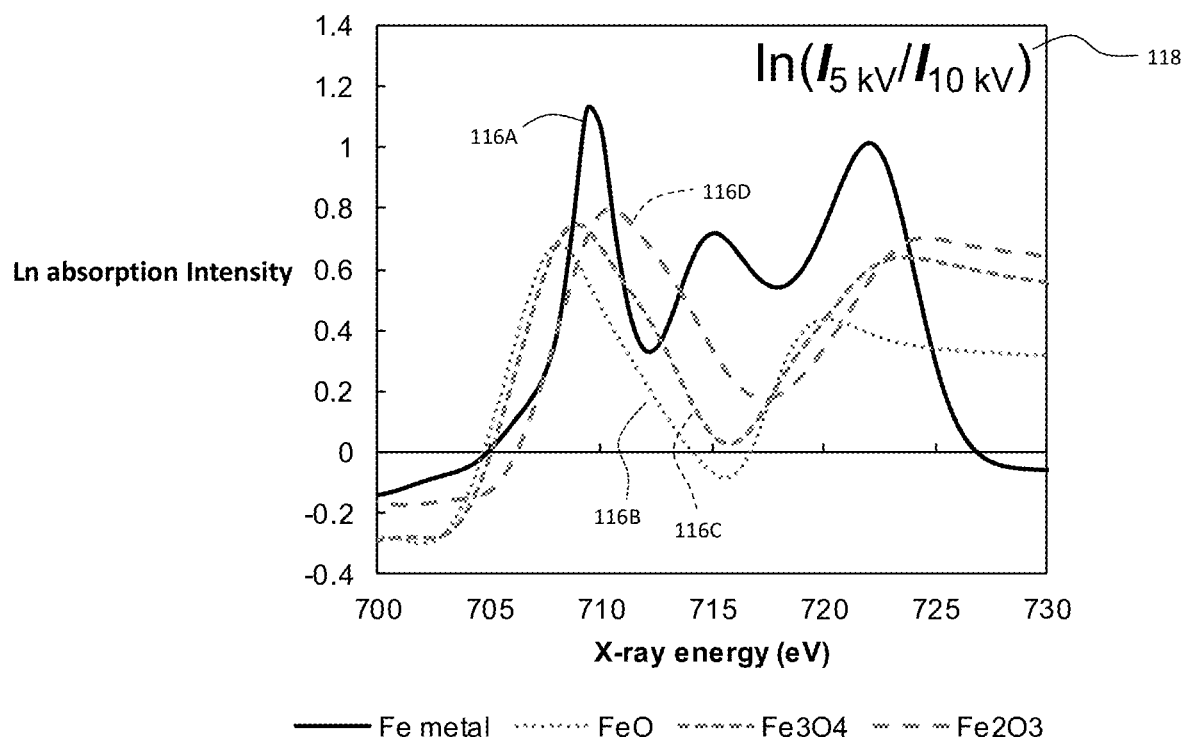
FIG. 7 is a diagram showing difference spectrums obtained from known compounds.

FIG. 7 illustrates difference spectrums 116A~116D obtained from known compounds. As sets of difference spectrum information, the database has stored therein the difference spectrums 116A~116D or information indicative of features of the difference spectrums 116A~116D. Reference numeral 118 denotes a mathematical formula used for calculating the difference spectrums 116A~116D.

Concerning each compound, two intensity spectrums corresponding to the accelerating potentials of 5 kV and 10 kV are obtained and normalized, and based on these two normalized intensity spectrums, each of the difference spectrums 116A~116D is calculated.

Specifically, the difference spectrum 116A is obtained from iron (i.e., Fe metal), while the difference spectrums 116B~116D are obtained from three kinds of iron oxides (i.e., FeO, $Fe_3O_4$, and $Fe_2O_3$). In all of the four difference spectrums 116A~116D, a peak is present at around 710 eV. However, the four difference spectrums 116A~116D differ from each other in the peak top position and the peak width, and also differ significantly from each other in the shape of the higher energy portion. Accordingly, compound identification can be carried out using the difference spectrums.

Third Embodiment

Figure 8:
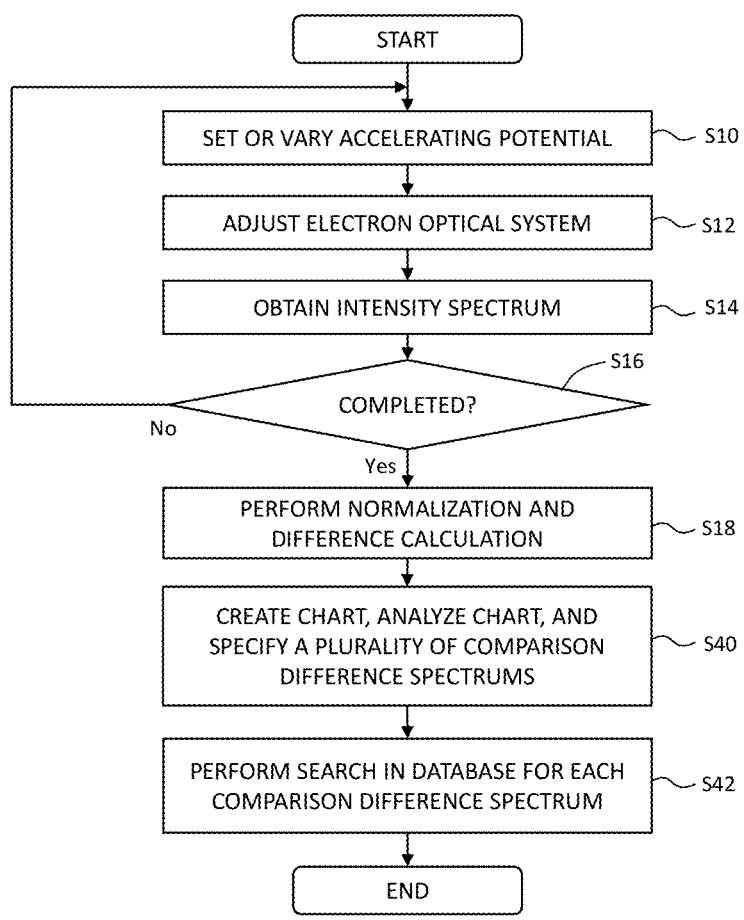
FIG. 8 is a flowchart showing a processing flow according to a third embodiment.

A third embodiment is next described by reference to FIG. 8. FIG. 8 is a flowchart showing processes according to the third embodiment. The processes of S10 through S18 in FIG. 8 are basically identical to those of S10 through S18 shown in FIG. 3.

In step S40, a chart is created, and based on an analysis of the chart, comparison difference spectrums are selected. The creation and analysis of the chart are described further below in detail.

In step S42, a search is performed in the database based on each of the comparison difference spectrums. Sample analysis results concerning depth ranges are thereby obtained. For example, a compound contained in the sample is identified for each depth range. In analyzing the chart, a machine learning algorithm may be used. In other words, a machine-learning-based image analyzer may be employed.

FIG. 9 shows an example chart. Here, it is assumed that an analysis of the intensity spectrums is to be performed regarding the Fe-Lα line. The chart 120 is created based on the intensity spectrums before normalization.

In the chart 120, the horizontal axis (i.e., a first change rate axis) shows a rate of change (i.e., a first change rate) in the average electron penetration depth value when the accelerating potential is varied by one variation step. The vertical axis shows a rate of change (i.e., a second change rate) in the absolute intensity of a specific peak (i.e., the Lα line peak) when the accelerating potential is varied by one variation step. An electron penetration depth in the sample is computed by, for example, a computer simulation.

Based on the accelerating potentials, first change rate values are obtained. Further, second change rate values are obtained based on the intensities of peaks of interest in the intensity spectrums (before normalization). The first change rate values and the second change rate values constitute change rate value pairs. In a coordinate system defined by the first change rate axis and the second change rate axis, graphic elements 122a indicative of the change rate value pairs are mapped. In this way, the chart 120 is created.

The graphic elements 122a constitute a graphic element array 122. The graphic element array 122 indicates changes in the self-absorption characteristic of the sample along the depth direction. From aspects or the form of the graphic element array 122, a sample state change at a certain depth can be identified.

In FIG. 9, the graphic element labeled 3 kV indicates the change rate value pair resulting when the accelerating potential is varied from 2 kV to 3 kV, while the graphic element labeled 4 kV indicates the change rate value pair resulting when the accelerating potential is varied from 3 kV to 4 kV.

In the graphic element array 122, the arrangement of the graphic elements labeled 3 kV~6 kV is almost linear (see reference numeral 124). A similar tendency is observed regarding the arrangement of the graphic elements labeled 6 kV~15 kV. At around 6 kV, a discontinuity or bend is observed. This discontinuity indicates that a change in the sample state occurs at a depth corresponding to 6 kV. By identifying the accelerating potential that generated the discontinuity, depth ranges (or depth positions) that should be the analysis target can be identified.

For example, if a significant change in the sample state occurs at around 4 kV, a significant disturbance or change would be generated in the graphic element array 122 as shown at reference numeral 128. In that case, the disturbance can be used as a reference for identifying depth ranges.

By using the chart 120, changes in the sample state in the depth direction can be expressed in a manner that can be readily understood visually. Accordingly, even a user inexperienced in sample analysis can easily identify a change in the sample state and, in particular, the depth at which the change occurs.

Figure 10:
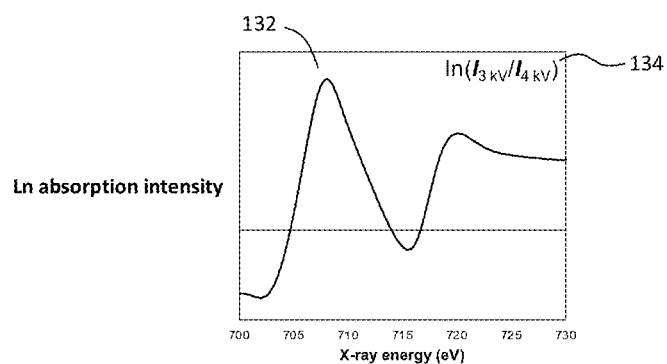
FIG. 10 shows an example difference spectrum corresponding to a shallow range.
Figure 11:
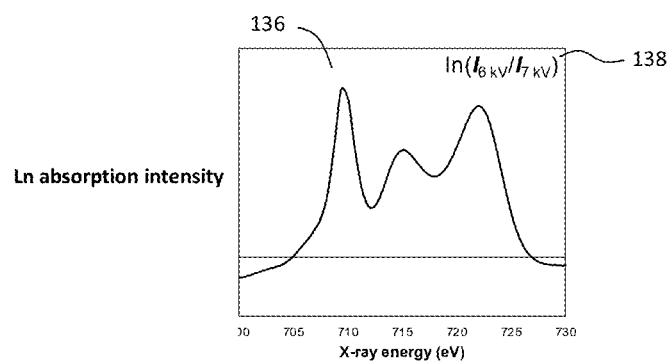
FIG. 11 shows an example difference spectrum corresponding to a deep range.

FIGS. 10 and 11 illustrate two difference spectrums. These difference spectrums are generated from the normalized characteristic spectrum set by taking into account the chart analysis results shown in FIG. 9. Each of the two difference spectrums is used as a comparison difference spectrum.

FIG. 10 shows a difference spectrum 132 calculated from the intensity spectrum corresponding to 3 kV and the intensity spectrum corresponding to 4 kV. Reference numeral 134 denotes a mathematical formula used for calculating the difference spectrum 132. FIG. 11 shows a difference spectrum 136 calculated from the intensity spectrum corresponding to 6 kV and the intensity spectrum corresponding to 7 kV. Reference numeral 138 denotes a mathematical formula used for calculating the difference spectrum 136.

A search is performed in the database based on the difference spectrums 132, 136 shown in FIGS. 10 and 11. For example, in a case where the database has registered therein the difference spectrums 116A~116D shown in FIG. 7, the difference spectrum 116B is retrieved as a spectrum corresponding to the difference spectrum 132. This signifies that the compound FeO is contained in the depth range represented by the difference spectrum 132. Further, as a spectrum corresponding to the difference spectrum 136, the difference spectrum 116A is retrieved. This signifies that Fe metal is contained in the depth range represented by the difference spectrum 136.

In the above-described configuration, an energy dispersive X-ray spectroscope may be used in place of the wavelength dispersive X-ray spectroscope including the CCD detector. Alternatively, a different type of X-ray spectroscope may be used. The object of detection may be X-rays including those other than soft X-rays, or may be X-rays other than soft X-rays. The above-described configuration may be applied to an apparatus which processes intensity spectrums and which does not include an X-ray spectroscope.

The invention claimed is:

1. A sample analysis apparatus, comprising:
a normalizer unit configured to normalize spectrums measured by irradiating an electron beam onto a sample while varying an accelerating potential and by detecting X-rays emitted from the sample, and thereby calculates normalized spectrums;
a difference calculator unit configured to calculate at least one difference spectrum based on the normalized spectrums; and
an analyzer unit configured to analyze the sample based on the at least one difference spectrum.

2. The sample analysis apparatus according to claim 1, wherein the analyzer unit comprises:
a database containing sets of difference spectrum information regarding known compounds; and
a search unit configured to perform a search in the database based on the at least one difference spectrum and thereby identify a compound contained in the sample.

3. The sample analysis apparatus according to claim 2, wherein
each of the sets of difference spectrum information includes at least one of a difference spectrum itself and information indicating a feature of the difference spectrum.

4. The sample analysis apparatus according to claim 2, wherein
the difference calculator unit calculates difference spectrums based on the normalized spectrums;
wherein, from among the difference spectrums, one or more comparison difference spectrums are specified; and
the search unit performs a search in the database for each of the comparison difference spectrums.

5. The sample analysis apparatus according to claim 4, further comprising:
a display device configured to display the difference spectrums; and
an input device configured to allow a user to select the one or more comparison difference spectrums from among the difference spectrums.

6. The sample analysis apparatus according to claim 4, wherein:
groups are set up among the difference spectrums, and a comparison difference spectrum is specified for each group;
the groups correspond respectively to depth ranges in the sample; and
the analyzer unit identifies a compound contained in the sample for each of the depth ranges.

7. The sample analysis apparatus according to claim 6, wherein:
the analyzer unit divides the difference spectrums into the groups by using similarity in spectrum shape as a grouping criterion.

8. The sample analysis apparatus according to claim 4, wherein:
during a process of varying the accelerating potential, an electron penetration depth into the sample changes, and an intensity of a specific peak included in each of the spectrums is varied among the spectrums,
the sample analysis apparatus further comprises a creation unit configured to create a chart by mapping, in a predetermined coordinate system, elements corresponding to respective specific peaks included in the spectrums, wherein the predetermined coordinate system has a first axis showing a rate of change of the electron penetration depth, and a second axis showing a rate of change of the intensity of the specific peak, and
based on an arrangement of the elements in the chart, the one or more comparison difference spectrums are specified.

9. The sample analysis apparatus according to claim 1, further comprising
an X-ray spectroscope that spectrally disperses X-rays, wherein
the X-ray spectroscope generates the spectrums.

10. A sample analysis method, comprising:
a step of measuring spectrums by irradiating an electron beam onto a sample while varying an accelerating potential and by detecting X-rays emitted from the sample;
a step of normalizing the spectrums and thereby calculating normalized spectrums;
a step of calculating at least one difference spectrum based on the normalized spectrums; and
a step of identifying a compound contained in the sample by performing a search, based on the at least one difference spectrum, in a database containing sets of difference spectrum information regarding known compounds.

11. The sample analysis method according to claim 10, wherein
in the step of calculating the normalized spectrums, each of the spectrums is normalized based on an intensity of a reference peak included in the spectrum.

12. The sample analysis method according to claim 10, wherein
the normalized spectrums include a reference spectrum and a target spectrum, and
in the step of calculating the at least one difference spectrum, a logarithmic difference is calculated, for each energy, between the reference spectrum and the target spectrum.

* * * * *